United States Patent [19]

Sekozawa et al.

[11] Patent Number: 4,569,012
[45] Date of Patent: Feb. 4, 1986

[54] METHOD AND SYSTEM FOR CONTROLLING FLUID TRANSPORTATION IN A PIPE NETWORK

[75] Inventors: Teruzi Sekozawa, Machida; Motohisa Funabashi, Sagamihara; Shinichiro Miyaoka, Kawasaki; Shigeyuki Shimauchi, Tokyo; Fumito Shinomiya; Teruo Takagi, both of Hitachi, all of Japan

[73] Assignees: Hitachi, Ltd.; Hitachi Control Systems, Inc., both of Tokyo, Japan

[21] Appl. No.: 655,436

[22] Filed: Sep. 28, 1984

Related U.S. Application Data

[63] Continuation of Ser. No. 343,378, Jan. 27, 1982, abandoned.

[30] Foreign Application Priority Data

Jun. 26, 1981 [JP] Japan .................................. 56-98300

[51] Int. Cl.$^4$ ............................................. G06F 15/20
[52] U.S. Cl. ..................................... 364/164; 364/420; 364/510; 137/2; 137/10; 137/11

[58] Field of Search ................. 239/69; 137/2, 10, 11, 137/624.11, 624.13, 624.14, 624.15; 364/164, 165, 420, 509, 510

[56] References Cited

U.S. PATENT DOCUMENTS

4,200,911  4/1980  Matsummoto ................. 364/510 X

Primary Examiner—Jerry Smith
Assistant Examiner—Allen MacDonald
Attorney, Agent, or Firm—Antonelli, Terry & Wands

[57] ABSTRACT

Method and system for controlling fluid transportation in a pipe network are disclosed. Pressures and flow rates at a predetermined number of points in the pipe network which number is smaller than the number of demand nodes in the pipe network are detected, demand volumes at the demand nodes are estimated based on known flow and pressure balance requirements for the pipe network and the detected flow rates and pressures, and the flow transportation in the pipe network is controlled in accordance with the estimated demand volumes such that the pressures at the demand nodes are brought to a reference pressure so that the pressures at the demand nodes at points other than the predetermined points are also brought to the reference pressure.

14 Claims, 6 Drawing Figures

FIG. 4

| | SPRING | | | | WINTER | | |
|---|---|---|---|---|---|---|---|
| | WEEK DAY | SAT. | SUN. | | WEEK DAY | SAT. | SUN. |
| VERY FINE | $w$ | $w$ | $w$ | | $w$ | $w$ | $w$ |
| FINE | $w$ | $w$ | $w$ | | $w$ | $w$ | $w$ |
| CLOUDY | $w$ | $w$ | $w$ | | $w$ | $w$ | $w$ |
| RAINY | $w$ | $w$ | $w$ | | $w$ | $w$ | $w$ |
| SNOWY | | | | | $w$ | $w$ | $w$ |

DEMAND NODE 1
DEMAND NODE 2

FIG. 5

| | WEEK DAY | SAT. | SUN |
|---|---|---|---|
| VERY FINE | $w$ | $w$ | $w$ |
| FINE | $w$ | $w$ | $w$ |
| CLOUDY | $w$ | $w$ | $w$ |
| RAINY | $w$ | $w$ | $w$ |
| SNOWY | | | |

DEMAND NODE 1
DEMAND NODE 2

FIG. 6

METHOD AND SYSTEM FOR CONTROLLING FLUID TRANSPORTATION IN A PIPE NETWORK

This is a continuation of application Ser. No. 343,378 filed Jan. 27, 1982 and now abandoned.

BACKGROUND OF THE INVENTION

The present invention relates to method and system for controlling a fluid transportation system by a water pipe network or a gas pipe network. By way of a specific example, a waterworks pipe network system is explained below.

A water supply system of the waterworks pipe network system (hereinafter simply referred to as a pipe network) includes a reservoir as a water supply, a plurality of demand nodes fed from the reservoir and a plurality of pipe networks connecting the reservoir with the plurality of demand nodes. The water supply control in the waterworks pipe network controls openings of valves and pressures of pumps in the pipe networks such that distributions of flow rate and pressure in the pipe network are maintained at desired distributions even when demand volumes at the demand nodes in the pipe network vary. In a prior art water supply control, an operator merely controls the valves and the pumps in accordance with an instruction manual in case of water shortage or failure. The operator is requested to supply the water with no less than a predetermined pressure in the high demand periods in the morning and in the evening. In order to meet the requirement, the operator supplies the water with a higher pressure than is normally required. In a low demand period in the night, the pressure in the pipe network rises and water leakage thereby amounts to one sixth of total amount of water supplied. In recent years, the price of the water has risen, and from a view point of energy saving, the water supply with a high pressure is not sufficient to resolve the problem. Accordingly, the water supply control in which the pressure in the pipe network is maintained at an appropriate pressure by finely controlling the valves and the pumps to comply with the variation of the demand such that the water is supplied with a necessary pressure in the high demand period and unnecessary pressure rise is suppressed in the low demand period to prevent the water leakage or the failure, has been desired.

The pipe network to be controlled includes no on-line sensor which directly senses the demand volume from time to time but includes monitoring sensors (pressure gauges or flow gauges) at only a certain number of points, for example, several tens of points in the pipe network having several hundreds of pipe lines or demand nodes.

It may be possible to control the water supply such that the pressures at the demand nodes at which the sensors are located are kept at a constant pressure in accordance with the outputs of the sensors. In this case, however, there is no assurance that the pressures at the demand nodes at which the sensors are not provided are kept at the constant pressure.

It may also be possible to arrange the sensors at all of the demand nodes. However, since the sensors and communication equipment for transmitting the data of the sensors are expensive, the number of the measuring points by the sensors must be limited in practice.

It may also be possible to utilize outflow meters provided at the demand nodes, but since the outflow meters are checked once a month, it is not possible to detect the variation of demand from time to time in a day.

SUMMARY OF THE INVENTION

It is an object of the present invention to provide method and system for controlling fluid transportation in a pipe network having a number of pipe lines and demand nodes, in which pressures at the demand nodes at which no sensor is located are maintained at a desired pressure in accordance with outputs of the sensors such as pressure gauges or flow gauges located at portions of the pipe lines or demand nodes.

In order to achieve the above object, the present invention includes a step of detecting pressures and flow rates at predetermined points which are smaller in number than the number of the demand nodes in the pipe network, a step of predicting demand volumes at respective demand nodes in accordance with predetermined flow and pressure balance requirements for the pipe network and the detected flow rates and pressures, and a step of controlling the fluid transportation in the pipe network in accordance with the estimated demand volumes such that the pressures at the respective demand nodes are maintained at a desired pressure.

DETAILED DESCRIPTION OF THE PREFERRED EMBODIMENTS

The present invention is now explained in accordance with the preferred embodiments thereof. In the present invention, the term "estimation" is distinctively used from the term "prediction". The term estimation is used for a relatively short control period and the term prediction is used for a relatively long control period. The estimation is made in the short time period (in terms of minute) in which information is transmitted between a demand volume estimation apparatus 2, a manipulation amount calculation apparatus 3 and as pipe network 13 while the prediction is made in terms of hours to plan an operation schedule of the next day or the next time of the day.

Figure 1:
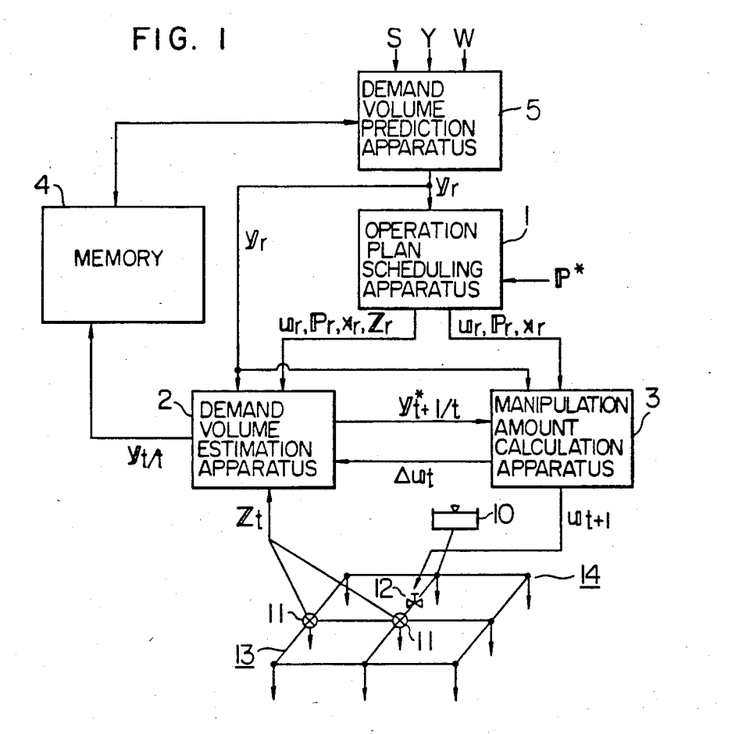
FIG. 1 shows a block diagram of one embodiment of the present invention.

Referring to FIG. 1, numeral 10 denotes a reservoir, numeral 11 denotes sensors such as pressure gauges or flow gauges, located in the pipe network 13, numeral 12 denotes a valve for controlling a water supply, and numeral 14 denotes demand nodes. The number of sensors 11 is less than the number of demand nodes 14.

Figure 4:
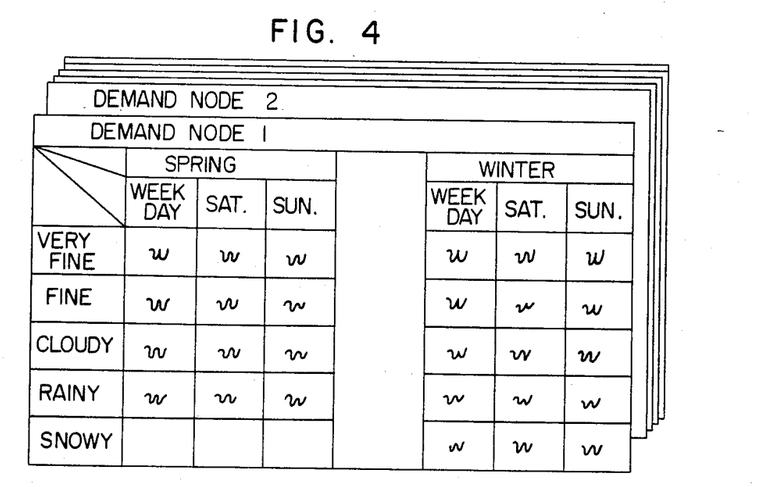
FIG. 4 shows a configuration of a base pattern table for demand volume.

The measured data $Z_t$, such as flow rates or pressures measured at time t by the sensors 11 are supplied to the demand volume estimation apparatus 2. The demand volume estimation apparatus 2 (which will be explained in detail hereinbelow) estimates a demand volume $y_{t/t}$ at the time t based on the measured data $Z_t$, manipulation amount deviation $\Delta u_t$, predicted demand volume $y_r$ and reference volume $Z_r$. A memory 4 stores a base table shown in FIG. 4 and a current pattern table shown in FIG. 5. These tables contain patterns indicating changes of demand volume in a day classified by weather and day of a week. The externally inputted day of week data Y and weather data W are supplied to the memory 4 through a demand volume prediction apparatus 5.

Figure 5:
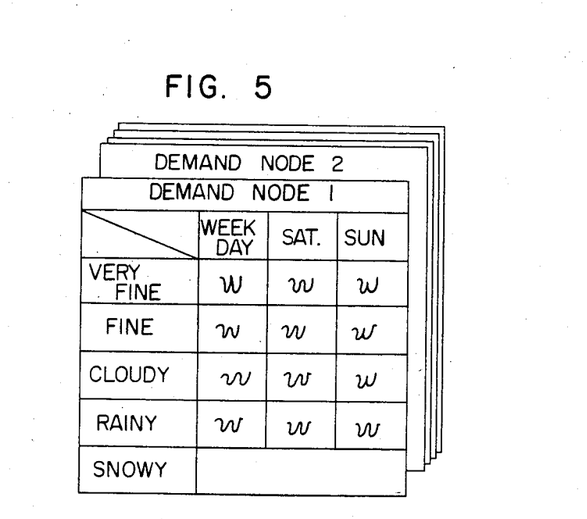
FIG. 5 shows a configuration of a current pattern table for demand volume.

During the one-day operation, the demand volume prediction apparatus 5 issues a write command to the memory 4, and the memory 4 writes the estimated demand volume $y_{t/t}$ produced from time to time by the demand volume estimation apparatus 2 into areas in the current pattern table specified by the day of week data Y and the weather data W in order to update the current pattern table with the latest pattern. The base pattern table stores a demand pattern derived by averaging the past estimated demand volumes at the respective demand nodes 14 by season, weather and day of week.

At the beginning of the day, i.e. at 0 o'clock a.m., the demand volume prediction apparatus 5 issues a readout command to the memory 4. The memory 4 selects base patterns for the respective demand nodes 14 corresponding to the externally inputted season data S, day of week data Y and weather data W, from the base pattern table and outputs them. It also selects current patterns for the respective demand nodes 14 corresponding to the day of week data Y and the weather data W, from the current pattern table and outputs them. The demand volume prediction apparatus 5 predicts the demand volumes of the day in accordance with the base patterns $B_r$ and the current patterns $C_r$ in the following manner. The predicted demand voltage $y_r$ is calculated by:

$$y_r = \hat{P}_r Q_f, \tag{1}$$

where $\hat{P}_r$ is a water distribution ratio, $Q_f$ is an average daily volume of water supply, and $P_r$ and $Q_f$ are calculated by:

$$\hat{P}_r = \alpha \beta_r + (1-\alpha) C_r, \tag{2}$$

$$Q_f = Q_B(1-\lambda_i) + F_{(r)}, \tag{3}$$

where
- $\alpha$ is a coefficient,
- $Q_B$ is a basic water volume,
- $\lambda_i$ is a holiday and weather factor, and
- $F_{(r)}$ is a correction term for an external disturbance factor such as temperature.

Figure 6:
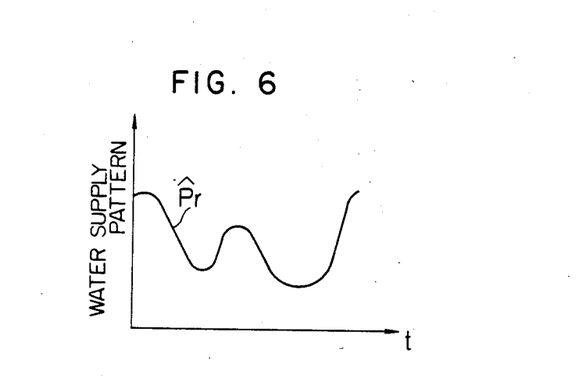
FIG. 6 shows an exemplary curve of a water supply pattern.

An example of $\hat{P}_r$ is shown in FIG. 6. The demand volumes are predicted for all of the demand nodes 14 in accordance with the equation (1) to produce predicted demand volume vectors $y_r$. The vectors $y_r$ thus obtained are supplied to the operation plan scheduling apparatus 1 and the demand volume estimation apparatus 2.

Figure 2:
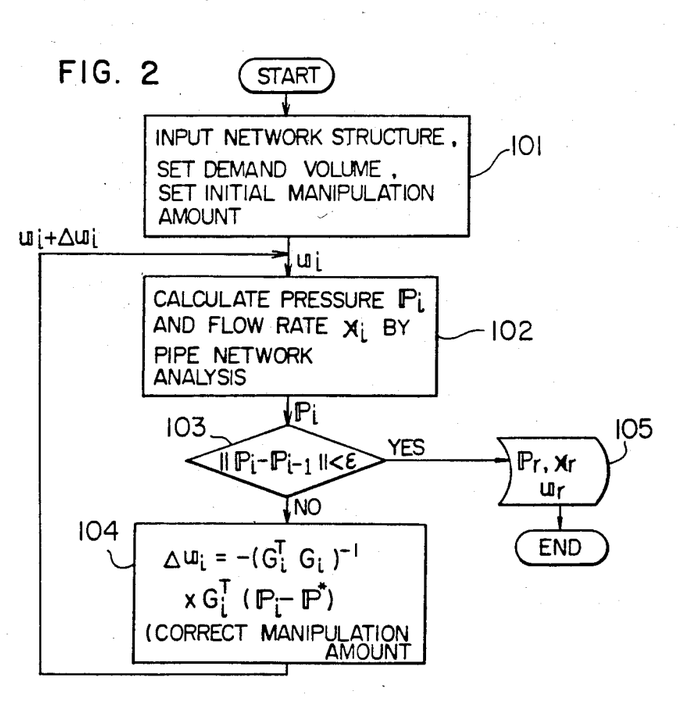
FIG. 2 shows an operational flow chart of an operation plan scheduling apparatus.

An operational flow chart for the operation plan scheduling apparatus 1 is shown in FIG. 2. Before explaining the operation of the apparatus 1, characteristics of the water supply pipe network are explained.

Physical characteristics of the waterworks pipe network to be controlled are expressed as follows in terms of flow balances at the demand nodes 14 and pressure balances in the pipe lines (branches).

Flow balance requirement $$f_i(x_j, y_i) = \sum_{j \in A^-(i)} x_j - \sum_{j \in A^+(i)} x_j - y_i = 0; \tag{4}$$

Pressure balance requirement

-continued $$g_j(x_j, p_i, u_j) = p_{s(j)} - p_{e(j)} - h_j(x_j, u_j) = 0 \tag{5}$$

where $$h_j(x_j, u_j) = \begin{cases} R_j|x_j|^{1.85} \text{ sgn } (x_j) \\ \text{(when the branch includes no valve)} \\ (R_j|x_j|^{1.85} + u_j|x_j|^2) \text{ sgn } (x_j) \\ \text{(when the branch includes valve)} \end{cases} \tag{6}$$

$i = 1, 2, \ldots n$ is the node (demand node) in the network,
$j = 1, 2, \ldots m$ is the branch (pipe line) in the network,
$p_i$ is the pressure at the node i,
$x_j$ is the flow rate in the branch j,
$y_i$ is the demand volume at the node i,
$A^+(i)$ is the aggregation of the branches beginning from i,
$A^-(i)$ is the aggregation of the branches ending at i,
$s(j)$ is the beginning point of the branch j,
$e(j)$ is the end point of the branch j,
$R_j$ is a resistance coefficient determined by the physical property of the branch j,
sgn $(x_j)$ is a sign of $x_j$, and
$u_j$ is a resistance coefficient determined by the opening of the valve.

In order to introduce a method for estimating the variation in the demand value, the measurement system is formalized. The measurement system is expressed as follows.

$$Z = H \begin{pmatrix} x \\ p \end{pmatrix} \tag{7}$$

where
Z is a measurement vector, $Z = (Z_1, Z_2, \ldots Z_{I_s})^T$,
$Z_i$ is a measured value by the sensor i,
$I_s$ is an order of the number of the sensors,
x is a flow vector, $x = (x_1, x_2, \ldots x_m)^T$,
p is a pressure vector, $p = (p_1, p_2, \ldots p_m)^T$,
H is a measurement matrix. For example, for the sensors located in the pipe network as shown in FIG. 1, the matrix is expressed by $$H = \begin{pmatrix} \underbrace{00 \ldots 00}_{12} & 000100000 \\ \underbrace{00 \ldots 00}_{12} & \underbrace{000010000}_{9} \end{pmatrix}$$

The measurement system equation (7) indicates that portions of the pressures or the flow rates are measured.

The operation of the operation plan scheduling apparatus 1 is as follows.

A method for determining an optimum manipulation amount for a given predicted demand volume is explained. An appropriate initial condition $u_o$ for a manipulation amount u is set (101). Since the demand volume $y_i$ at the demand node i provided by the demand volume prediction apparatus 5 and the manipulation amount $u_j$ in the pipe line j for the initial manipulation amount $u_o$ are given, they are put in the equations (1), (2) and (3) and the flow rate x and the pressure p are calculated by a network analysis method for simulating the flow rate and the pressure of the pipe network such as Marlow method or Newton method (102). Based on the calculated flow rate and pressure, a correction amount $\Delta u$ for the manipulation amount u is determined such that an evaluation function is best improved. Using the corrected amount of u, the flow rate and the pressure of the pipe network are again simulated to determine x and p for the next step (102-104). The above operation is repeated until x and p converge to fixed values so that an optimum solution is obtained. The above process is expressed by the following formulas. As an evaluation function for determining an optimum operation plan, the following formula which intends the pressure control is established.

$$J = ||p - p^*||^2 \to \min, \quad (8)$$

where $p^*$ is a control reference value determined from the view points of decreasing the water leakage and maintaining the service pressure and it is externally supplied to the operation plan scheduling apparatus 1, and p is the pressure at the demand node in the pipe network. The correction amount $\Delta u$ for the manipulation amount u is determined such that the evaluation function J is best improved. The correction amount for the manipulation amount in the (i+1)th step is given by $$\Delta u_{i+1} = -(G_i^T G_i)^{-1} G_i^T (p_i - p^*) \quad (9)$$

where $G_i$ is a matrix consisting of n low rows $(A^{-1}{}_i B_i)$, $$A_i = \begin{pmatrix} \dfrac{\partial f(x_i, y_i)}{\partial x}, & \phi \\ \dfrac{\partial g(x_i, p_i, u_i)}{\partial x}, & \dfrac{\partial g(x_i, p_i, u_i)}{\partial g} \end{pmatrix}$$

$$B_i = \begin{pmatrix} \phi \\ -\dfrac{\partial g(x_i, p_i, u_i)}{\partial u} \end{pmatrix}$$

The manipulation amount $u_{i+1}$ in the (i+1)th step is given by:

$$u_{i+1} = u_i + \Delta u_{i+1}. \quad (10)$$

The above step is repeated until it converges to the optimum value ($J < \epsilon$), when the manipulation amount (opening of the valve or pressure of the pump) $u = u_r$ (optimum manipulation amount), the flow rate $x_r$ and the pressure $p_r$ are calculated. A scheduled reference vector $Z_r$ is calculated from the following formula:

$$Z_r = H \begin{pmatrix} x_r \\ p_r \end{pmatrix}. \quad (11)$$

In this manner, the operation plan scheduling apparatus 1 calculates the $u_r$, $p_r$, $x_r$ and $Z_r$.

The demand volume estimation apparatus 2 is now explained.

Since the number of sensors 11 is limited with respect to the variation in the demand volume, it is not possible to directly determine the variation in the demand volume of the entire network 13. Accordingly, in accordance with the theory of Kalman filter, the demand volume estimation apparatus 2 operates to estimate the variation in the demand volume of the entire network based on information measured at the limited number of points to predict the demand volume at the next time point. If the system is controlled in accordance with the scheduled operation plan in spite of the variation in the demand volumes at the respective demand nodes 14, the pressure and the flow rate of the entire network would vary and would not be maintained at the proper values. Thus, in order to follow the variation of the demand volume, the valves and the pumps are controlled such that the flow rate and the pressure are brought to the proper values and maintained thereat. In this case, it is necessary to determine the manipulation amount which satisfies the flow and pressure balance requirements. Since the planned value for a given demand volume has been predetermined by the operation plan scheduling apparatus 1, the control is made in accordance with the variance from the given demand volume. The variations of the pressure and the flow rate due to the variations $\Delta y_t$ of the demand volume at a given time point t are expressed by the following formulas in accordance with the equations (4) to (7). (It is assumed here that the manipulation amount is changed by $\Delta u_t$.)

$$f(x_r, y_r) + \dfrac{\partial f(x_r, y_r)}{\partial x} \Delta x_t + \dfrac{\partial f(x_r, y_r)}{\partial y} \Delta y_t = 0 \quad (12)$$

$$g(x_r, p_r, u_r) + \dfrac{\partial g(x_r, p_r, u_r)}{\partial x} \Delta x_t + \dfrac{\partial g(x_r, p_r, u_r)}{\partial p} \Delta p_r + \quad (13)$$

$$\dfrac{\partial g(x_r, p_r, u_r)}{\partial u} \Delta u_t = 0$$

Since $x_r$, $p_r$ and $u_r$ are scheduled operation plan values for the demand volume $y_r$ and they satisfy the flow and pressure balance requirements, the formulas (12) and (13) can be rewritten by the following matrix:

$$A_r \begin{pmatrix} \Delta x \\ \Delta p \end{pmatrix}_t = B_r \Delta u_t + C_r \Delta y_t; \quad (14)$$

where $$A_r = \begin{pmatrix} \dfrac{\partial f(x_r, y_r)}{\partial x}, & \phi \\ \dfrac{\partial g(x_r, p_r, u_r)}{\partial x}, & \dfrac{\partial g(x_r, p_r, u_r)}{\partial p} \end{pmatrix}$$

$$B_r = -\begin{pmatrix} \phi \\ \dfrac{\partial g(x_r, p_r, u_r)}{\partial u} \end{pmatrix}$$

$$C_r = \begin{pmatrix} -\dfrac{\partial f(x_r, y_r)}{\partial y} \\ \phi \end{pmatrix}$$

and $E_r = A_r^{-1} B_r$ and $F_r = A_r^{-1} C_r$.

Since the variation $\Delta y_t$ of the demand volume to be estimated is unknown, it is determined in the following manner (status equation). The formula (14) is constantly brought to zero with a first order approximation, and the second order and after are not expressed. When the measurement noise is considered, it is practical to express it as follows. It is referred to as an output equation (Equation (16) is derived from the equations (14) and (7)).

Status equation $$\Delta y_{t+1} = D \Delta y_t + \epsilon_t \quad (15)$$

Output equation $$\Delta Z_t = HF_r \Delta y_t + HE_r \Delta u_t + w_t \tag{16}$$

where $\epsilon_t$ is a statistic parameter indicating possibility of variation in time of the demand volume and $w_t$ is the measurement noise described above which is known. The values $\epsilon_t$ and $w_t$ are independent from each other and they are assumed as follows.

For any t, mean values $E(\epsilon_t)$ and $E(w_t)$ are zero, and square mean valves are:

$$E(\xi_t \xi_\tau^T) = P_t \delta_{t\tau}, \; E(w_t w_\tau^T) = R_t \delta_{t\tau}.$$

It is also assumed that $\epsilon_t$ and $w_t$ are white randam series. D is a transition matrix of the demand volume.

The operation of the demand volume estimation apparatus 2 is now explained.

The demand volume estimation apparatus 2 receives a difference $\Delta Z_t(=Z_t-Z_r)$ between the measured value at the time t and the reference value and a difference $\Delta u_t(=u_t-u_r)$ between the manipulation amount at the time t and a planned operation value and estimates the variation of the demand volume of the entire pipe network from the following relationships:

$$\Delta y_{t/t} = \Delta y^*_{t/t-1} + K_t \{\Delta z_t - (HF_r \Delta y^*_{t/t-1} + HE_r \Delta u_t)\} \tag{17}$$

$$\left. \begin{array}{l} K_t = S_t (HF_r) R_t^{-1} \\ S_t^{-1} = (HF_r)^T Re^{-1}(HF_r) + P_t^{-1} \end{array} \right\} \tag{18}$$

where:
$\Delta y_{t/t}$ is the demand volume (variation) at the time (t) predicted at the time (t),
$\Delta y^*_{t/t-1}$ is the demand volume (variation) at the time (t) predicted at the time (t−1),
$K_t$ is an estimation error correction gain,
$\Delta Z_t$ is a measured value $(Z_r - Z_t)$ of the pressure (flow rate) at the time (t),
$HF_r$ is a sensitivity matrix of $\Delta Z$ for $\Delta y$,
$HE_r$ is a sensitivity matrix of $\Delta Z$ for $\Delta u$,
$R_t$ is a variance matrix of the measured noise $w_t$ at the time t, and
$P_t$ is a variance matrix of $\xi_t$ at the time t.

As is apparent from the equation (18), the demand volume estimation apparatus 2 corrects the variation $y^*_{t/t-1}$ of the demand volume predicted at the time (t−1) by a value derived from the second term of the equation (18) in accordance with $y^*_{t/t-1}$ and the variation $\Delta u_t$ of the manipulation amount. The correction gain $K_t$ is chosen such that it minimizes the square mean value of the estimation errors at the time t and it is determined from time to time at every estimation time from the equation (18).

The predicted demand volume (variation) $y^*_{t+1/t}$ and the variance matrix of $\xi_{t+1}$ at the next sampling time (t+1) are determined from the following prediction formulas:

$$\Delta y^*_{t+1/t} = D \Delta y_{t/t} \tag{19}$$

$$P_t = DS_t D^T + P_t \tag{20}$$

In this manner, the predicted variation $\Delta y^*_{t+1/t}$ of the demand volume is determined by sequentially receiving the measured value $Z_t$ and the manipulation amount $u_t$. Accordingly, for the variations of the demand volumes at the demand nodes, the variation of the demand volume of the entire pipe network 13 is estimated based on the information at a small number of measurement points and the demand volume at the next time point is predicted.

The operation of the manipulation amount calculation apparatus 3 is now explained.

The apparatus 3 has a function of determining the manipulation amount $u_{t+1}$ at the time t based on the demand volume $\Delta y^*_{t+1/t}$ at the next time point (t+1) predicted by the demand volume estimation apparatus 2 and the manipulation amount $\Delta u_t$ at the time point t. The apparatus 3 establishes the following evaluation function in order to minimize a deviation from the reference pressure to maintain a proper pressure:

$$J_{t+1} = \left\| \begin{pmatrix} \Delta X_{t+1} \\ \Delta P_{t+1} \end{pmatrix} \right\|^2 + ||u_{t+1} - u_t||^2 \longrightarrow \min. \tag{21}$$

The first term in the formula (21) functions to bring the variations of the flow rate and the pressure due to the variation of the demand volume close to the operation plan valve $$\begin{pmatrix} x_r \\ P_r \end{pmatrix}$$

and the second term functions to prevent the deviation from the manipulation amount $u_{t+1}$ at the time (t+1) from excessively increasing.

The manipulation amount which minimizes the evaluation function is expressed by the following formulas:

$$\Delta u_{t+1} = -(E^T PE + Q)^{-1} [E^T PF \Delta y^*_{t+1/t} + Q(u_r - u_t)] \tag{22}$$

$$u_{t+1} = u_r + \Delta u_{t+1} \tag{23}$$

where
$E(=A_r^{-1} B_r)$ is a sensitivity matrix of $$\begin{pmatrix} \Delta x \\ \Delta p \end{pmatrix}$$

for $\Delta u$,
$F(=A_r^{-1} C_r)$ is a sensitivity matrix of $$\begin{pmatrix} \Delta x \\ \Delta p \end{pmatrix}$$

for $\Delta y$,
p is a weighted matrix of the first term of the equation (18),
Q is a weighted matrix of the second term of the equation (18), and
$u_r$ is the operation plan value for the demand volume $y_r$.

Figure 3:
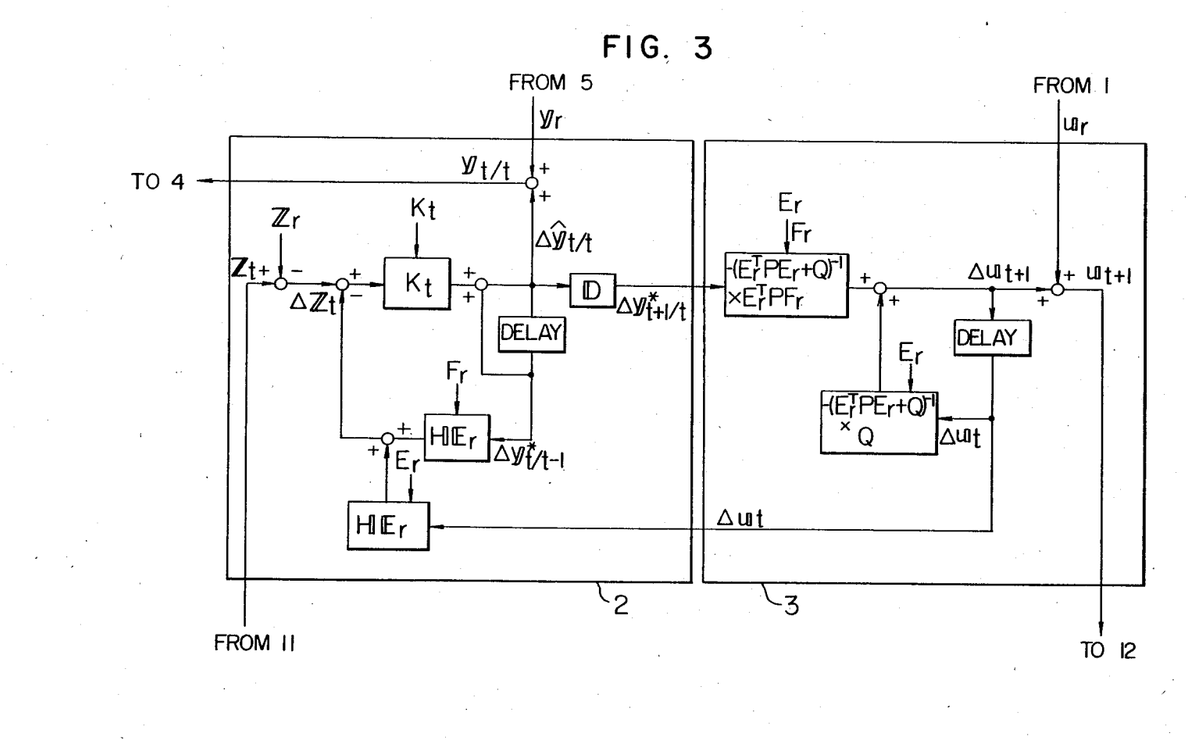
FIG. 3 shows a block diagram of a demand volume estimation apparatus and manipulation amount calculation apparatus.

Since $u_r - u_t$ in the right side of the formula (22) is equal to $\Delta u_t$, the control scheme described above can be considered as a kind of PI (proportion-integration) type control. By introducing the second term of the evaluation function (21), the fatigue and the failure of the value can be reduced. FIG. 3 shows a block diagram of the demand volume estimation apparatus 2 and the manipulation amount calculation apparatus 3.

As described hereinabove, the present invention offers the following advantages.

(1) The pressures at the demand nodes at which no sensor is located can be maintained within a desired pressure range. By estimating the demand volumes at the respective demand nodes in the pipe network from the data measured at the limited number of measurement points, the demand nodes or the pipe lines other than the measuring points can be controlled such that overpressure or underpressure due to the variation of the demand volume is prevented.

(2) Since the demand volume is predicted based on the past water supply demand data sorted by day of week and weather, the water supply is controlled in accordance with fine demand prediction.

(3) As shown in FIG. 1, the operation plan scheduling apparatus 1 for optimizing a multivariable non-linear model based on the predicted demand volume and the manipulation amount calculation apparatus 3 and the demand volume estimation device 2 having a linear pipe network model and providing a linear optimum feedback control are separately provided. Thus, by previously carrying out the optimum calculation for determining the optimum operation plan by an off-line calculation, the on-line calculation apparatus 2 and 3 are simplified. As a result, the water supply control for a large scale pipe lines including several hundreds of pipe lines can be attained.

(4) Input information can be supplied to the demand volume prediction apparatus based on the on-line estimated demand volume. Since the on-line demand volume data and demand volume variation factors are automatically logged by the demand volume prediction apparatus, the precision of the operation plan is enhanced.

I claim:

1. A control system for fluid transportation comprising:
   means for reserving fluid;
   a plurality of demand nodes for exhausting the fluid;
   a pipe network for connecting said reserving means with said demand nodes;
   a plurality of sensors located at a predetermined number of points in said pipe network which number is less than the number of said demand nodes for detecting flow parameters in said pipe network at said points;
   adjust means located at a selected point in said pipe network for adjusting a flow rate of said fluid in said pipe network;
   a memory unit for storing past demand volumes of said fluid at said demand nodes;
   demand volume prediction means for predicting demand volumes of said fluid at said demand nodes from said past demand volumes;
   operation plan scheduling means for calculating operation plan scheduling values for flow rates, pressures and manipulation amounts from said predicted demand volumes,
   an estimation means for estimating flow parameters at points at which no sensor is located based on current flow parameters at said predetermined number of points detected by said sensors, said predicted demand volumes, and said scheduling values, said estimation means estimating a demand volume of said fluid for each of said demand nodes as a function of a linear pipe network equation and storing said estimated demand volume in said memory unit; and
   means for calculating said manipulation amounts based on said predicted demand volumes and said operation plan scheduling values and estimated demand volume, and for controlling said adjust means such that outputs of said estimation means are brought to a reference value predetermined by said operation plan scheduling means.

2. A control system according to claim 1 wherein said memory unit stores a pattern representing demand volumes of said fluid in a day sorted by weather and day of the week.

3. A control system in accordance with claim 2 wherein the predicted demand volume is represented by the parameter $y_r$ and is calculated by solving the equation $$y_r + \hat{P}_r \times Q_f$$

wherein $Q_f$ is an average daily volume of water supply and $\hat{P}_r$ is a water distribution ratio.

4. A control system for fluid transportation comprising:
   means for reserving fluid;
   a plurality of demand nodes for exhausting the fluid;
   a pipe network for connecting said reserving means with said demand nodes;
   a plurality of sensors located at a predetermined number of points in said pipe network which number is less than the number of said demand nodes for detecting flow parameters in said pipe network at said points;
   adjust means located at a selected point in said pipe network for adjusting the flow rate of said fluid in said pipe network;
   a memory unit for storing past demand volumes of said fluid at said demand nodes;
   demand volume prediction means for predicting at first time intervals demand volumes of said fluid at said demand nodes from said past demand volumes read from said memory unit;
   operation plan scheduling means, in response to said predicted demand volumes supplied from said demand volume prediction means, for calculating operation plan scheduling values for flow rates and pressures in said pipe network and a manipulation amount of said adjust means based on said predicted demand volumes;
   demand volume estimation means connected to said demand volume predicting means, operation plan scheduling means and said plurality of sensors to respectively receive said predicted demand volumes, said operation plan scheduling values and said detected flow parameters, said demand volume estimation means estimating at second time intervals shorter than said first time intervals, in response to a manipulation amount supplied thereto, a demand volume of said fluid for each of said demand nodes as a function of a linear pipe network equation based on said manipulation amount, said detected flow parameters, said predicted demand volumes and said operation plan scheduling values, said estimation means storing said estimated demand volume in said memory unit and further estimating a demand volume of said fluid for each of said demand nodes to be used in the next control cycle of said adjust means based on said first mentioned estimated demand volume; and manipulation amount calculation means connected to said demand volume predicting means, said operation plan scheduling means and said estimation means for calculating, in response to said further estimated demand volume supplied from said estimation means, a manipulation amount of said adjust means based on said predicted demand volumes, said operation plan scheduling values and said further estimated demand volume and for controlling said adjust means in accordance with said calculated manipulation amount such that variations in flow rates and pressures caused by variations in said estimated demand volumes approach said operation plan scheduling values by calculating said manipulation amount to meet a predetermined evaluation function.

5. A control system according to claim 4 wherein said memory unit stores a pattern representing demand volumes of said fluid in a day sorted by weather and day of the week.

6. A control system in accordance with claim 4 wherein the predicted demand volume is represented by the parameter $y_r$ and is calculated by solving the equation $$y_r = \hat{P}_r \times Q_f$$

wherein $Q_f$ is an average daily volume of water supply and $\hat{P}_r$ is a water distribution ratio.

7. A method for controlling fluid transportation in a pipe network system having means for reserving fluid, a plurality of demand nodes for exhausting said fluid, a pipe network for connecting said means with said demand nodes, a plurality of sensors located at a predetermined number of points in said pipe network which number is less than the number of said demand nodes for detecting flow parameters in said pipe network at said points, adjust means located at a selected point in said pipe network for adjusting a flow rate of said fluid in said pipe network, and a memory unit for storing a pattern of past demand volumes of said fluid at said demand nodes, the method comprising:

a first step of reading out said pattern of past demand volumes from said memory unit and calculating predicted demand volumes $y_r$ of said fluid at said demand nodes;

a second step of calculating operation plan scheduling values for flow rates, pressures and a manipulation amount from said predicted demand volumes $y_r$ calculated in said first step and from corresponding scheduled values by pipe network analysis, a third step of estimating flow parameters in said pipe network based on said predicted demand volumes $y_r$ calculated in said first step and said operation plan scheduling values calculated in said second step, from the flow parameters detected by said plurality of sensors and a change of said manipulation amount and flow balance requirements and pressure balance requirements in said pipe network to estimate a demand volume of said fluid for each of said demand nodes and storing said demand volume in said memory unit and to further estimate the variation of said demand volume;

a fourth step of calculating manipulation amounts $u_r$ based on said predicted demand volumes $y_r$ calculated in said first step and said operation plan scheduling values calculated in said second step and said estimated demand volume estimated in said third step, and controlling said adjust means in accordance with said amounts $u_r$ which causes differences between said flow parameters estimated in said third step and scheduled values to be smaller than predetermined values.

8. A method for controlling fluid transportation according to claim 7 further comprising:

a fifth step for updating said pattern of demand volumes of said fluid stored in said memory unit based on differences between said flow parameters at said predetermined number of points detected by said sensors and the flow parameters in said pipe network calculated in said third step.

9. A method for controlling fluid transportation according to claim 7 further comprising:

a fifth step for estimating a variation of demand volume in the entire pipe network from the differences between said flow parameters at said predetermined number of points detected by said sensors and said flow parameters in said pipe network calculated in said first step and correcting said manipulation amounts $u_r$ calculated in said fourth step based on said differences.

10. A method in accordance with claim 7 wherein the predicted demand volume $y_r$ is calculated by solving the equation $$y_r = \hat{P}_r \times Q_f$$

wherein $Q_f$ is an average daily volume of water supply and $\hat{P}_r$ is a water distribution ratio.

11. A method for controlling fluid transportation in a pipe network system having means for reserving fluid, a plurality of demand nodes for exhausting said fluid, a pipe network for connecting said means with said demand nodes, a plurality of sensors located at a predetermined number of points in said pipe network which number is less than the number of said demand nodes for detecting flow parameters in said pipe network at said points, adjust means located at a selected point in said pipe network for adjusting the flow rate of said fluid in said pipe network, and a memory unit for storing a pattern of past demand volumes of said fluid at said demand nodes, the method comprising:

a first step of reading out said pattern of past demand volumes from said memory unit and calculating predicted demand volumes $y_r$ of said fluid at said demand nodes;

a second step of calculating operation plan scheduling values for flow rates and pressures in said pipe network and a manipulation amount of said adjust means from said predicted demand volumes $y_r$ calculated in said first step so that said calculated scheduling values satisfy a desired optimum operation plan, a third step of estimating flow rates x and pressures p in said pipe network based on said predicted demand volumes $y_r$ calculated in said first step and said operation plan scheduling values calculated in said second step from the flow rates and pressures detected by said plurality of sensors and a change in manipulation amount $\Delta u_t$ and flow balance requirements and pressure balance requirements in said pipe network to estimate a demand volume $y_t$ of said fluid for each of said demand nodes and storing said estimated demand volume in said memory unit, and further estimating a demand volume $y_{t+1}$ for the next control cycle of said adjust means based on said first mentioned estimated demand volume $y_t$ and a preselected statistical variation parameter, a fourth step of calculating a manipulation amount $u_{t+1}$ based on said predicted demand volumes $y_r$ calculated in said first step and said operation plan scheduling values calculated in said second step and said further estimated demand volume estimated in said third step, and controlling said adjust means in accordance with said calculated manipulation amount $u_{t+1}$ so that variations in the flow rates and pressures caused by variation in the estimated demand volumes approach said operation plan sheduling values.

12. A method for controlling fluid transportation according to claim 11 further comprising:
a fifth step for updating said pattern of demand volumes of said fluid stored in said memory unit based on differences between said flow parameters at said predetermined number of points detected by said sensors and the flow parameters in said pipe network calculated in said third step.

13. A method for controlling fluid transportation according to claim 11 further comprising:
a fifth step for estimating a variation of demand volume in the entire pipe network from the differences between said flow parameters at said predetermined number of points detected by said sensors and said flow parameters in said pipe network calculated in said first step and correcting said manipulation amounts $u_r$ calculated in said fourth step based on said differences.

14. A method in accordance with claim 11 wherein the predicted demand volume $y_r$ is calculated by solving the equation $$y_r = \hat{P}_r \times Q_f$$

wherein $Q_f$ is an average daily volume of water supply and $\hat{P}_r$ is a water distribution ratio.

* * * * *